April 17, 1928.
O. E. BUCKLEY
DYNAMOMETER
Filed Dec. 30, 1922
1,666,680
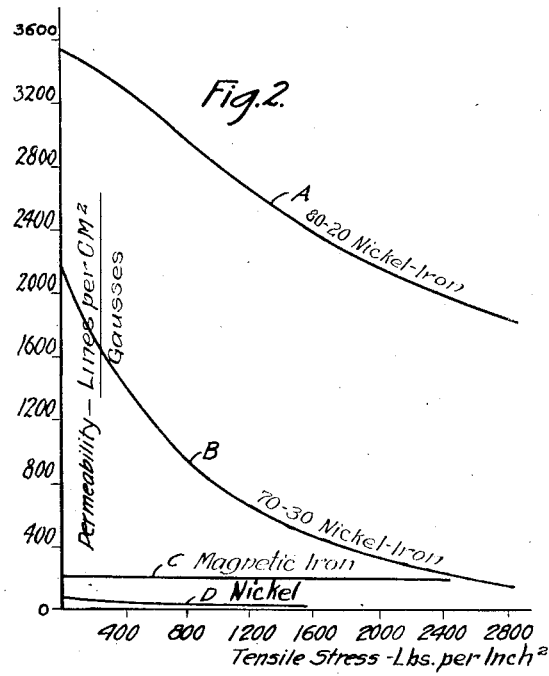
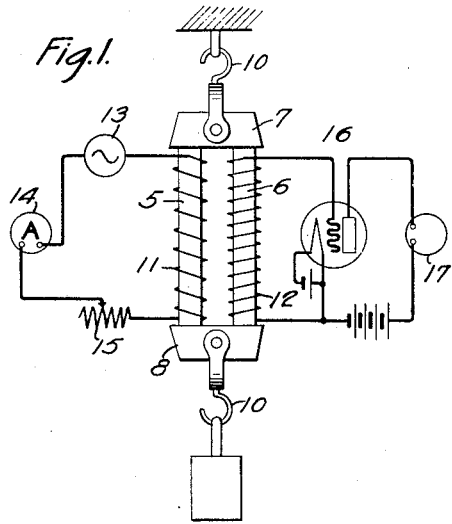
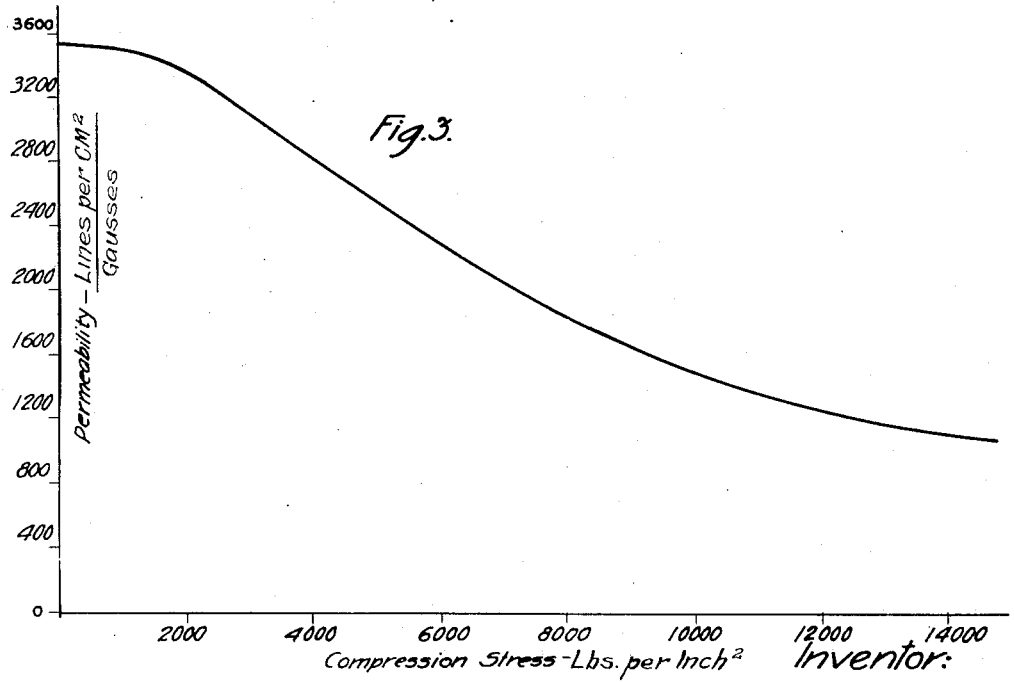
Inventor:
Oliver E. Buckley.
by C. E. Sprague, Atty.

Patented Apr. 17, 1928.

1,666,680

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

DYNAMOMETER.

Application filed December 30, 1922. Serial No. 610,015.

This invention relates to dynamometers and methods for measuring stresses and in particular to a dynamometer which may be used for measuring rapidly varying stresses or those resulting in very small displacements. It is an object of the invention to provide a dynamometer which is constant in operation and which can be used for accurately determining the values of rapidly varying stresses as well as stresses involving practically no displacement.

To attain this object and in accordance with the principal feature of the invention, there is provided a dynamometer having its actuating member composed of a material, the permeability of which is highly susceptible to varying mechanical stresses. A change in permeability by the action of mechanical stresses has been found to be characteristic of many magnetic substances but in varying degrees. For some magnetic substances, a compression will produce an increase in permeability and tension a decrease whereas for other materials the opposite is true. The effect of stresses also depends upon the magnetic state of the substances as, for example, with iron the effect of tension in weak magnetic fields is to increase the permeability while in strong magnetic fields the effect is to reduce the permeability. This effect of mechanical stress on the permeability of certain magnetic substances is reproducible provided the substance is initially in the annealed state and subsequently never stressed beyond its elastic limit. It follows that with a knowledge of the change in permeability produced by a stress together with a knowledge of the permeability stress relation, one may accurately determine the magnitude of the stress and thus the magnetic material may be utilized as a dynamometer. However, in practicing the invention it is not necessary to know the absolute values of permeability, but only an indication of the changes that take place, since a calibration scale or curve may be employed. In this connection it is desirable that the permeability of the magnetic material vary continuously in one direction over a wide range for a given kind of stress and that these variations be quite pronounced. Certain nickel iron alloys, in which the nickel component predominates, have been found to be particularly suitable for this use. A proper heat treatment of such alloys is, however, an essential.

Referring to the drawings, Fig. 1 shows a preferred form of dynamometer in accordance with the features of the invention, Fig. 2 shows the variations in permeability with varying tension, for nickel, magnetic iron, and various nickel iron alloys, and Fig. 3 shows the variation of permeability with varying compression for a nickel iron alloy.

Referring to Fig. 1 there is disclosed a dynamometer having a magnetic circuit consisting of parallel arms 5 and 6 terminating in end portions 7 and 8. These end portions preferably are integral with arms 5 and 6 and are provided with hook members 10, 10 to provide means for using the device to measure tensions. For measuring compressions the hooks will be rotated slightly to permit the compressional force to be exerted directly on end portions 7, 8. The magnetic members 5, 7, 6, 8 may be of any one of a variety of magnetic materials as explained above but is preferably of an iron-nickel alloy. A primary winding 11 is provided on arm 5 and a secondary winding 12 is wound upon arm 6. The primary winding is connected to a source of alternating current 13, ammeter 14 and a variable resistance 15. The secondary winding is connected to the input side of an amplifier 16, the output of which is connected to an indicating device 17. In the case of a steady stress the device 17 may be a voltmeter, but if the stress is variable a recording device such as an oscillograph should be used.

The curves of Fig. 2 show the variation in permeability with varying tensional stresses of preferred alloys as compared with magnetic iron and pure nickel. In each case a magnetic field strength of .01 gauss was employed. The effect of the earth's field was eliminated by passing a direct current through an independent winding surrounding the specimen. Curve A is for a nickel iron alloy containing 80% nickel and 20% iron. Curve B is for a nickel iron alloy containing 70% nickel and 30% iron. Curve C is for magnetic iron and curve D for pure nickel. It will be noted that curve B shows the most pronounced change in permeability although a uniform change of considerable magnitude is represented by curve A. With pure nickel as represented by curve D the change is barely perceptible and the change in permeability of magnetic iron under these conditions was not perceptible. The curve of Fig. 3 shows the change in permeability due to varying compression stresses exerted thereon for an alloy consisting of 78½% nickel and 21½% iron, proportions very closely approximating those of the alloy shown in curve A of Fig. 2.

The material used in obtaining curve B is prepared by fusing nickel and iron together in the proportion of 70% nickel and 30% iron, good commercial grades of these materials being suitable for this purpose. The fused composition is poured into a mould to bring it at once to the proper shape, or it may be brought to the desired shape after molding be being hammered, swaged, drawn, rolled or worked in any other manner. The composition is then given a heat-treatment to develop therein the highest permeability possible at low magnetizing forces and the lowest possible coercive force. According to present practice, this is done by heating the desired shape to a temperature of about 850° C., maintaining it at that temperature for a few minutes to insure a uniform temperature throughout, then cooling slowly to a temperature of above 600° C. which is just about the critical or transition temperature of the alloy, that is, the temperature at which the magnetic properties disappear on heating and reappear on cooling; and finally cooling from that temperature more rapidly but at a definite rate dependent upon the ratio of nickel to iron in the alloy. A convenient method of securing the desired rate of cooling after the material has been maintained for a few minutes at a temperature of 850° C. has been found to be a rapid withdrawing of the material from the furnace and placing it in a blast of air which is controlled to secure a desired rate of cooling. The necessary cooling will always be at a rate intermediate that required for annealing and that at which such strains would be set up in the material as to lower its permeability below the desired value.

In the operation of the device the stress is applied to the magnetic arms 5 and 6 by means of the hooks 10, 10 in case the stress is one of tension; if the device is being employed to measure a compressional stress, the force is applied directly to the end portions 7 and 8. The alternating current passing from the source of supply 13 through the winding 11 produces a magnetization of the arms 5 and 6 and hence an induced electromotive force in the secondary winding 12 which is amplified by the amplifier 16 and then acts upon the indicating device 17. In the case of a constant stress this indicating device is preferably a voltmeter. The stress in the material produced by the tension applied to arms 5 and 6 produces a change in the permeability of the material and consequently a change in the induced electromotive force in the secondary winding. The value of the stress corresponding to a given change in permeability is determined from a previous calibration of the apparatus. However in the case of a stress which is variable an oscillograph is employed for the indicating device 17 and the oscillograph record thus obtained is a wave of the same frequency as the current wave through the primary winding and of an amplitude depending on the stress in the magnetic material. The envelope of the amplitude of this wave is the stress curve from which may be determined the mechanical stress if the apparatus has previously been calibrated. Knowing the frequency of the alternating current through the primary winding, the forces and the time in which they occur may be accurately determined.

In special cases where it is desired to determine the stresses in a rod which constitutes a member in a mechanical system the rod itself may be employed as the magnetic material to operate as a dynamometer in determining the forces of tension, compression or torsion. This rod is equipped with primary and secondary windings functioning as in the previous case and in certain cases it may be necessary to add an additional winding connected with a source of direct current supply for the purpose of neutralizing the earth's field through the rod.

What is claimed is:

1. A dynamometer for measuring mechanical stress comprising a member composed of a magnetic material that undergoes a change in permeability of at least 200 c. g. s. units, continuously in one direction, when subjected to a mechanical stress of 4000 lbs. per square inch or less, means for applying stress to said member, and means for quantitatively indicating a change in permeability of said member.

2. A dynamometer for measuring mechanical stresses comprising a member composed of a material the permeability of which is varied at least 200 c. g. s. units by mechanical stresses of 4,000 lbs. per square inch or less, means for magnetizing said member, means for applying stresses to said member, and means for quantitatively indicating the change in permeability thereof.

3. A dynamometer for measuring mechanical stresses comprising a member composed of an alloy containing from 70% to 80% nickel, and the balance chiefly iron, means for magnetizing said member, and means for quantitatively indicating the change in permeability thereof.

4. A dynamometer for measuring mechanical stresses comprising a member composed of an alloy containing approximately 70% nickel and the balance chiefly iron, means for applying stresses to said member, means for magnetizing said member, and means for quantitatively indicating the change in permeability thereof.

5. A dynamometer for measuring mechanical stresses comprising a member composed of nickel iron alloy containing 70% nickel and 30% iron, means for applying stresses to said member, means for magnetizing said member, and means for quantitatively indicating the change in permeability thereof.

In witness whereof, I hereunto subscribe my name this 28th day of December, A. D., 1922.

OLIVER E. BUCKLEY.